United States Patent
Lin et al.

(10) Patent No.: US 9,462,243 B2
(45) Date of Patent: Oct. 4, 2016

(54) METHOD FOR CONTROLLING OPERATIONS OF RGBW DISPLAY BASED ON HUMAN FACTOR

(71) Applicant: AU Optronics Corp., Hsin-Chu (TW)

(72) Inventors: Hui-Feng Lin, Hsin-Chu (TW); Sheng-Wen Cheng, Hsin-Chu (TW)

(73) Assignee: AU OPTRONICS CORP., Hsin-Chu (TW)

(*) Notice: Subject to any disclaimer, the term of this patent is extended or adjusted under 35 U.S.C. 154(b) by 0 days.

(21) Appl. No.: 14/566,726

(22) Filed: Dec. 11, 2014

(65) Prior Publication Data
US 2015/0181182 A1    Jun. 25, 2015

(30) Foreign Application Priority Data
Dec. 23, 2013   (TW) .............................. 102147801 A

(51) Int. Cl.
| | |
|---|---|
| H04N 9/31 | (2006.01) |
| G09G 3/34 | (2006.01) |
| G09G 5/08 | (2006.01) |
| G09G 5/06 | (2006.01) |

(52) U.S. Cl.
CPC .......... H04N 9/3182 (2013.01); G09G 3/3426 (2013.01); G09G 5/06 (2013.01); G09G 2300/0452 (2013.01); G09G 2320/064 (2013.01); G09G 2320/0646 (2013.01); G09G 2320/0666 (2013.01); G09G 2320/0673 (2013.01); G09G 2330/023 (2013.01); G09G 2340/06 (2013.01)

(58) Field of Classification Search
CPC .... G09G 3/20; G09G 3/3406; G09G 3/3611; G09G 3/2092; G09G 5/02; G09G 3/3216; G09G 3/2003; H04N 1/6027
USPC .......... 382/232; 345/589, 604, 690, 77, 102, 345/593; 355/38; 348/790
See application file for complete search history.

(56) References Cited

U.S. PATENT DOCUMENTS

| | | | | |
|---|---|---|---|---|
| 4,642,683 A | * | 2/1987 | Alkofer ................ | H04N 1/6027 355/38 |
| 7,847,805 B2 | * | 12/2010 | Ogasawara .......... | G09G 3/2003 345/593 |

(Continued)

FOREIGN PATENT DOCUMENTS

TW    I361010    3/2012

OTHER PUBLICATIONS

* MCUs Tune LED Color Via Algorithms and Feedback, Jan. 24, 2012, Kristin Lewotsky * A comparison of four multimedia RGB spaces, year 2003 "Danny Pascale" * Histograms Show gamma—encoded data, Oct. 11, 2011, Wayne Fulton.*

*Primary Examiner* — Devona Faulk
*Assistant Examiner* — Kevin Wu
(74) *Attorney, Agent, or Firm* — McClure, Qualey & Rodack, LLP

(57) ABSTRACT

A method for controlling a display is provided. An RGB video signal is transformed into an RGBW video signal based on a human factor. The display has a plurality of pixels configured to display images according to the RGBW video signal, where each of the pixels has a red subpixel, a green subpixel, a blue subpixel and a white subpixel. According to the method, when brightness of a backlight module of the display is reduced to decrease energy consumption of the display, quality of the images of the display observed by users is still maintained within an acceptable range.

19 Claims, 9 Drawing Sheets

(56) References Cited

U.S. PATENT DOCUMENTS

| | | | |
|---|---|---|---|
| 8,115,787 B2* | 2/2012 | Ben-Chorin | G09G 5/02 345/690 |
| 8,654,141 B2 | 2/2014 | Zhang | |
| 8,730,273 B2 | 5/2014 | Chu-Ke | |
| 2005/0280615 A1* | 12/2005 | Cok | G09G 3/3216 345/77 |
| 2007/0064162 A1* | 3/2007 | Yamamoto | G09G 3/2092 348/790 |
| 2007/0216636 A1* | 9/2007 | Lo | G09G 3/3406 345/102 |
| 2009/0092325 A1* | 4/2009 | Brown Elliott | G09G 3/20 382/232 |
| 2009/0207182 A1* | 8/2009 | Takada | G09G 3/3406 345/589 |
| 2010/0259556 A1* | 10/2010 | Inuzuka | G09G 3/3611 345/604 |
| 2013/0293508 A1 | 11/2013 | Lin | |
| 2014/0022271 A1 | 1/2014 | Lin | |

\* cited by examiner

METHOD FOR CONTROLLING OPERATIONS OF RGBW DISPLAY BASED ON HUMAN FACTOR

BACKGROUND OF THE INVENTION

1. Field of the Invention

The present invention is related to a method for controlling a display, and more particularly to a method for controlling a RGBW (red, green, blue, white) liquid crystal display.

2. Description of the Prior Art

With the advancement of display panel technologies, liquid crystal display (LCD) panels are widely used in portable devices such as laptops, tablet computers, and smart phones. In general, power consumption of the portable devices should be low so that the portable devices may operate over a long period of time without being charged. However, due to RGB (red, green, blue) LCD panels having low light penetration rate such that only 5% to 10% of light intensity from backlight penetrates panels, energy used for illuminating panels is not fully utilized. Thus pixels should be re-designed to increase light penetration rate so as to utilize energy more efficiently and reduce power consumption of panels.

In contrast, RGBW (red, green, blue, white) LCD panels have higher light penetration rate and lower power consumption because white subpixels having higher light penetration rate are introduced into pixels. However, due to each subpixel (respectively being red, green, blue, white) of RGBW LCD panels occupying a smaller area than that of each subpixel of RGB LCD panels, images displayed on RGBW LCD panels are darker when the images are single colored (pure color), and brightness may be too bright when RGBW LCD panels display all white images. Thus image quality of RGBW LCD panels may be poorer than RGB LCD panels.

Moreover, a color filter of a wide colour gamut LCD panel causes diminution of light penetration rate of the wide colour gamut LCD panel. Thus, the brightness of the wide colour gamut LCD panel is reduced. Further, a multi-wavelength backlight module of the wide colour gamut LCD panel has a poor efficiency for emitting light. Therefore, it is necessary to increase the power of the multi-wavelength backlight module to push the brightness of the panel to a desired brightness. Due to the foresaid factors, the power consumption of the wide colour gamut LCD panel is increased. Accordingly, the battery life of a portable device (e.g. a smart phone, a tablet computer, etc.) having the wide colour gamut LCD panel is shortened, so it would be inconvenient for the user.

SUMMARY OF THE INVENTION

An embodiment of the present invention provides a method for controlling a display. The method may be used in a multi-primary color display having a color space greater than 90% of NTSC (National Television System Committee) color space. The method comprises: the display receiving an image signal of a group of pixels, the group of pixel comprising a plurality of pixels; respectively transforming a red data value, a green data value and a blue data value of each of the pixels into a red brightness value, a green brightness value and a blue brightness value of the each of the pixels; setting a maximum of the red brightness values, the green brightness values and the blue brightness values of the pixels as a maximum brightness value, and setting a minimum of the red brightness values, the green brightness values and the blue brightness values of the pixels as a minimum brightness value; obtaining a saturation value according to the maximum brightness value and the minimum brightness value; transforming the saturation value into a boundary brightness value according to a human factor; obtaining a mapping ratio according to the boundary brightness value and the maximum brightness value; respectively multiplying the red brightness value, the green brightness value and the blue brightness value of each of the pixels by the mapping ratio to obtain a red mapping brightness value, a green mapping brightness value and a blue mapping brightness value of the each of the pixels; dividing a minimum of the red mapping brightness value, the green mapping brightness value and the blue mapping brightness value of the each of the pixels by an adjustment parameter to obtain a white transformation brightness value of the each of the pixels; respectively subtracting the white transformation brightness value of the each of the pixels from the red mapping brightness value, the green mapping brightness value and the blue mapping brightness value of the each of the pixels to obtain a red transformation brightness value, a green transformation brightness value and a blue transformation brightness value of the each of the pixels; obtaining a red output brightness value, a green output brightness value, a blue output brightness value and a white output brightness value of the each of the pixels by respectively determining whether the red transformation brightness value, the green transformation brightness value, the blue transformation brightness value and the white transformation brightness value of the each of the pixels are greater than a threshold; respectively transforming the red output brightness value, the green output brightness value, the blue output brightness value and the white output brightness value of the each of the pixels into a red output data value, a green output data value, a blue output data value and a white output data value of the each of the pixels; and the display displaying the each of the pixels according to the red output data value, the green output data value, the blue output data value and the white output data value of the each of the pixels.

According to the method, when brightness of a backlight module of the display is reduced to decrease energy consumption of the display, quality of the images of the display seen by users is still maintained within an acceptable range.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a schematic diagram of a display having a plurality of display areas according to an embodiment of the present invention.

FIG. 5 is a schematic diagram of a backlight module of the display in FIG. 1.

DETAILED DESCRIPTION

Figure 1:
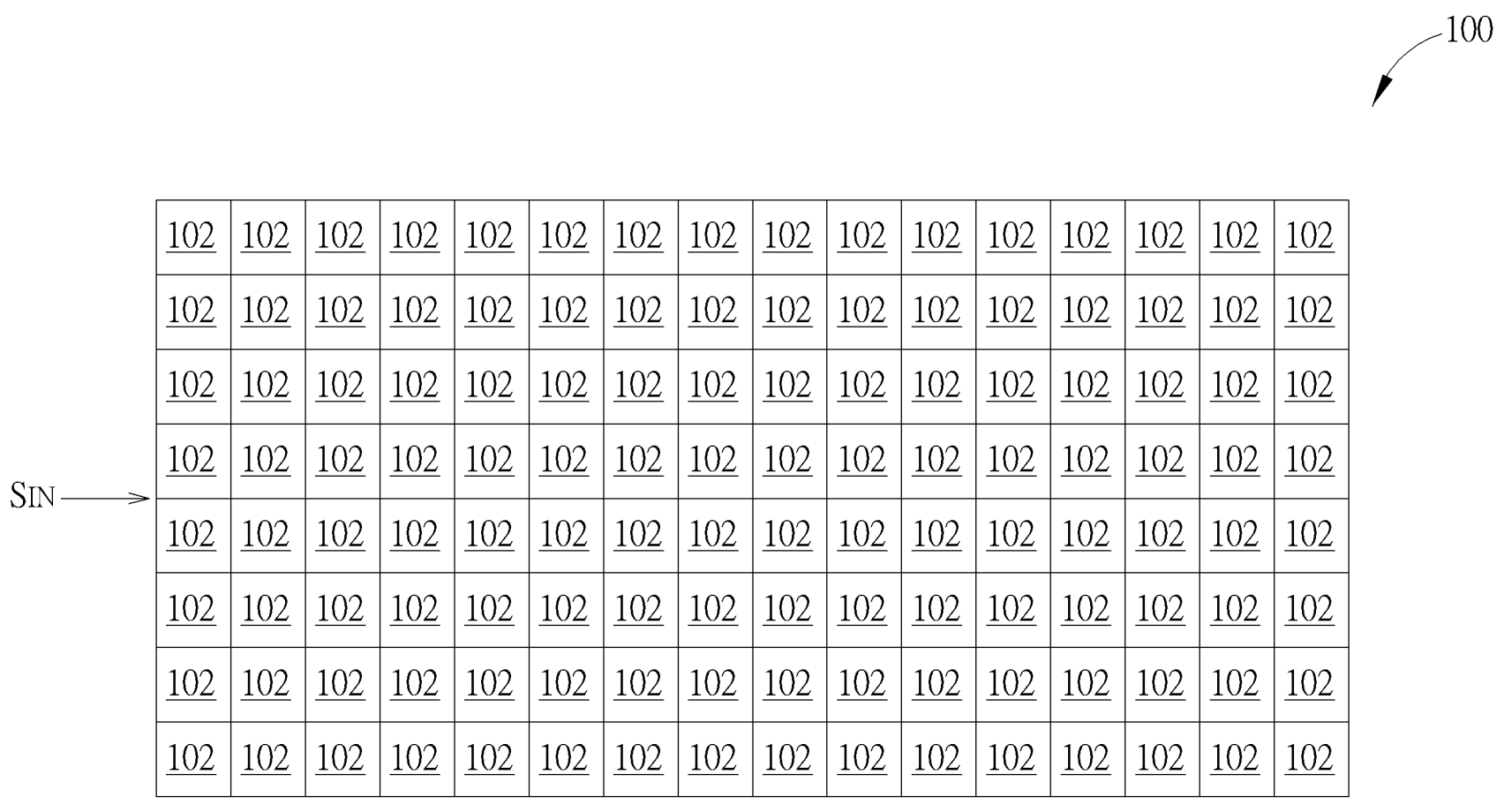
Figure 2:
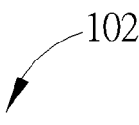
FIG. 2 is a schematic diagram of one of the display areas.
Figure 3:
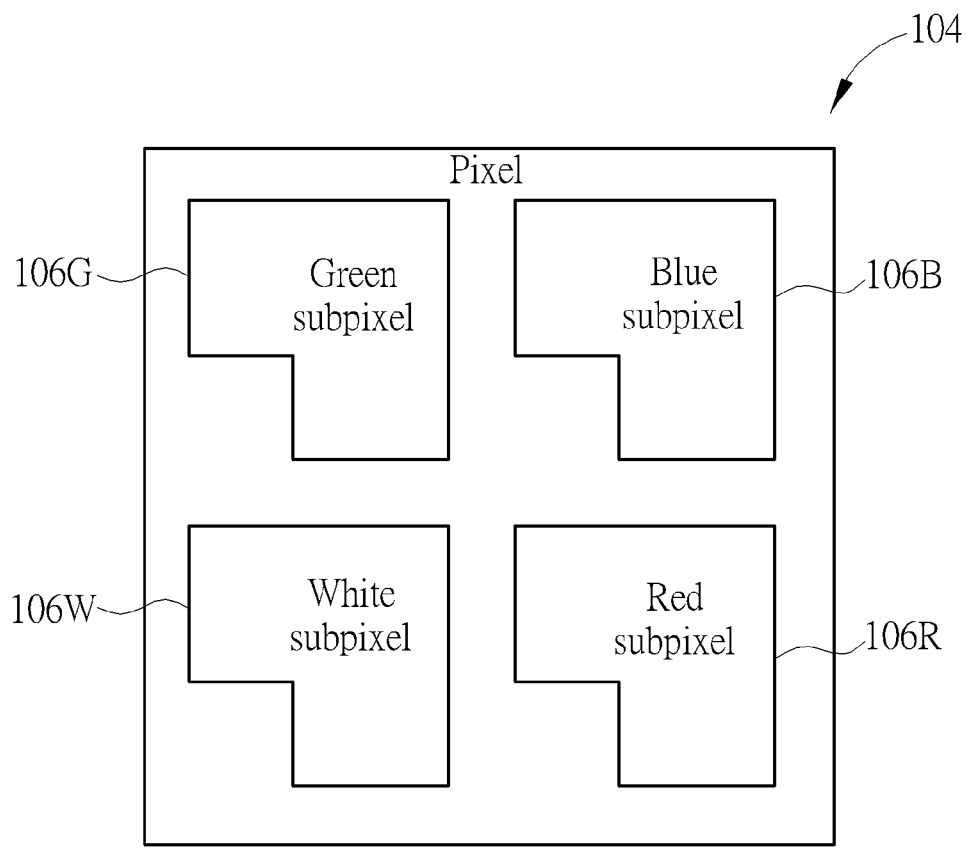
FIG. 3 is a schematic diagram of a pixel according to an embodiment of the present invention.
Figure 4:
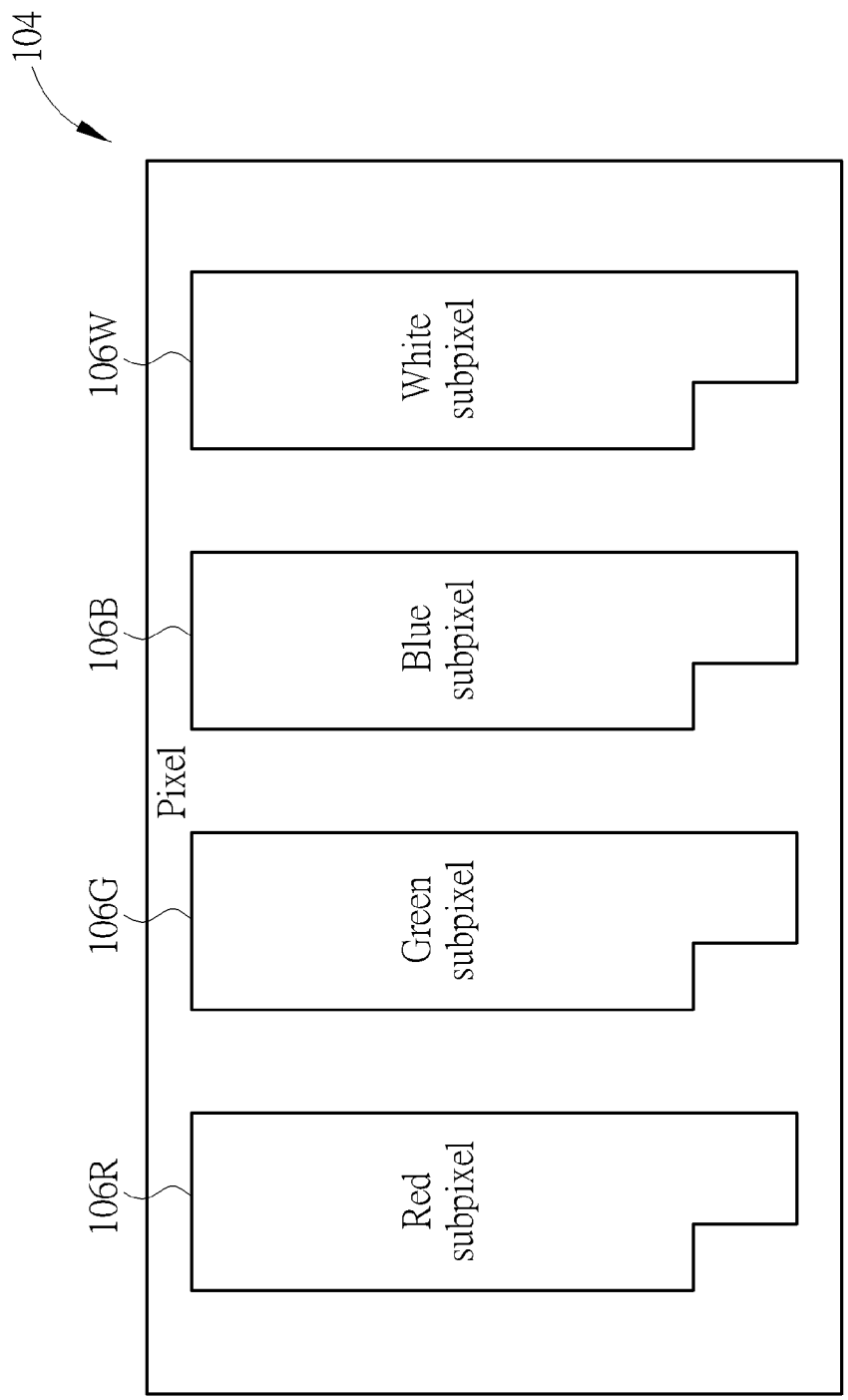
FIG. 4 is a schematic diagram of a pixel according to another embodiment of the present invention.

Please refer to FIG. 1 to FIG. 2. FIG. 1 is a schematic diagram of a display 100 having a plurality of display areas 102 according to an embodiment of the present invention, and FIG. 2 is a schematic diagram of one of the display areas 102. In the embodiment, the display 100 may be a wide colour gamut display having a color space greater than 90% of NTSC color space, which is a standard established by National Television System Committee. However, the present invention is not limited thereto. The display 100 has 128 display areas 102 arranged in 16 columns and 8 rows. Each of the display areas 102 has n pixels. If the display 100 has a resolution of 1920×1080, for example, n is equal to 16200 (i.e. (1920×1080)/(16×8)). For the sake of easily understanding the present invention, n may be set to be equal to 25 as shown in FIG. 2. Moreover, each of the pixels 104 has four subpixels, and the arrangement of the four subpixels is not limited to a specific disposition. As shown in FIG. 3, each of the pixels 104 has four subpixels arranged in two columns and two rows, and the four subpixels are a red subpixel 106R, a blue subpixel 106B, a green subpixel 106G and a white subpixel 106W. As shown in FIG. 4, the red subpixel 106R, the blue subpixel 106B, the green subpixel 106G and the white subpixel 106W of each pixel 104 may be arranged in a row and four columns. The white subpixel 106W is configured to improve the brightness of the pixel 104, such that an efficiency of a wide colour gamut panel of the display 100 for emitting light is increased. It should be understood that the number of the display areas 102, the number of the pixels 104 and the arrangement of the subpixels in the present invention are not limited to those as mentioned above. In other words, according to the method of the present invention, the selectivity of the number of the display areas 102, the number of the pixels 104 and the arrangement of the subpixels are various.

Figure 5:
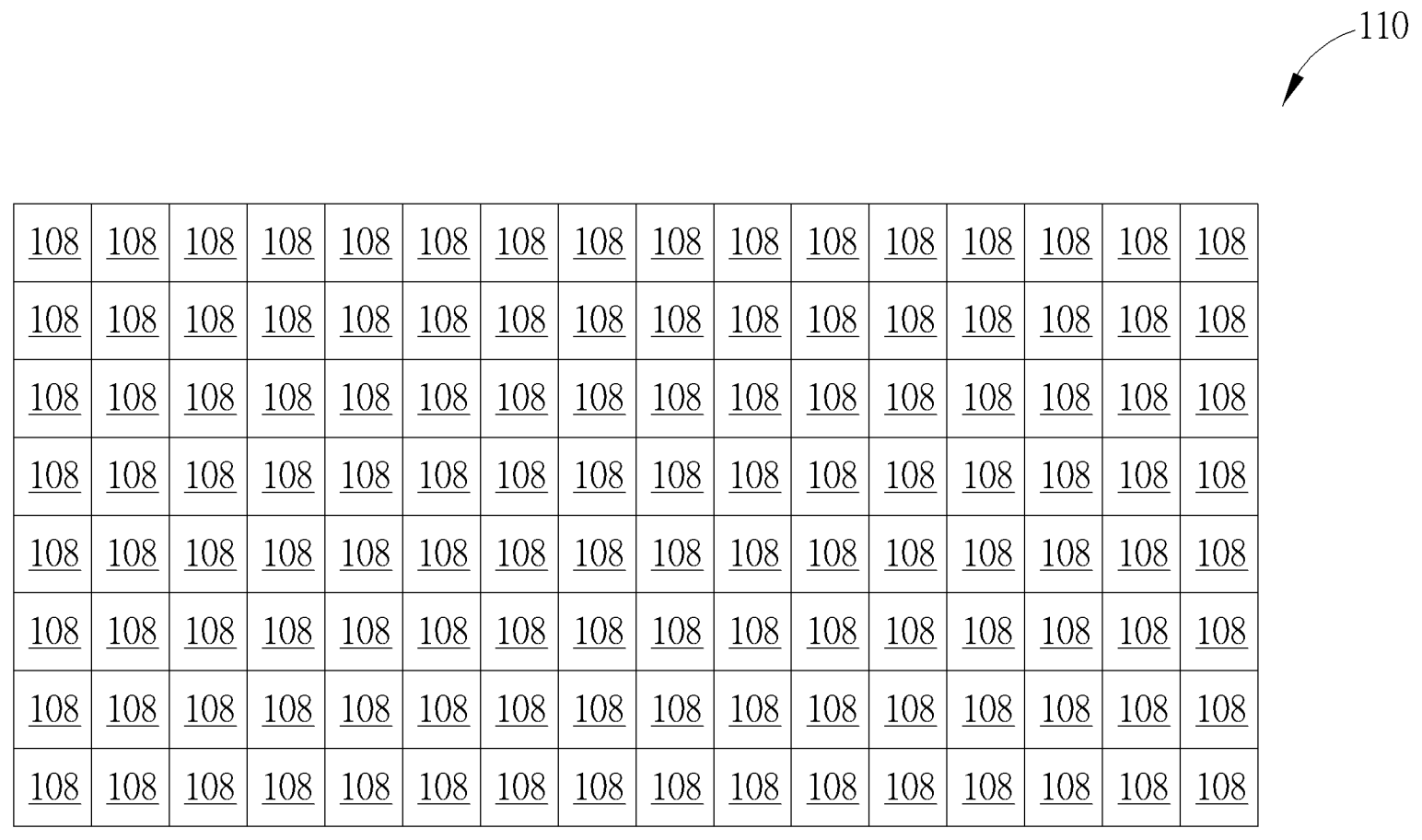

Please refer to FIG. 1 and FIG. 5. FIG. 5 is a schematic diagram of a backlight module 110 of the display 100 in FIG. 1. The backlight module 110 has a plurality of backlight units 108. Each of the backlight units 108 is corresponded to one of the display areas 102 and is configured to illuminate the corresponding display area 102. The display 100 may control the operations of the pixels 104 of each display area 102 and the strength of light emitted by each backlight unit 108 according to an image signal $S_{IN}$, such that the quality of the images of the display 100 seen by users may be still maintained within an acceptable range when the energy consumption of the display 100 is decreased by reducing the brightness of the backlight module 110. In the embodiment, the image signal $S_{IN}$ is an RGB (red, green, blue) signal, and a driving circuit of the display 100 would convert the image signal $S_{IN}$ into an RGBW (red, green, blue, white) signal and control the backlight units 108 through dynamic calculations of backlighting of each display area 102 while converting the image signal $S_{IN}$ into the RGBW signal to make each of the display areas 102 have a good image quality. All images signals corresponding to each display area 102 are included in the image signal $S_{IN}$, and the display 100 may control the display areas 102 respectively and the corresponding backlight units 108 according to the corresponding image signals of the display areas 102.

Figure 6:
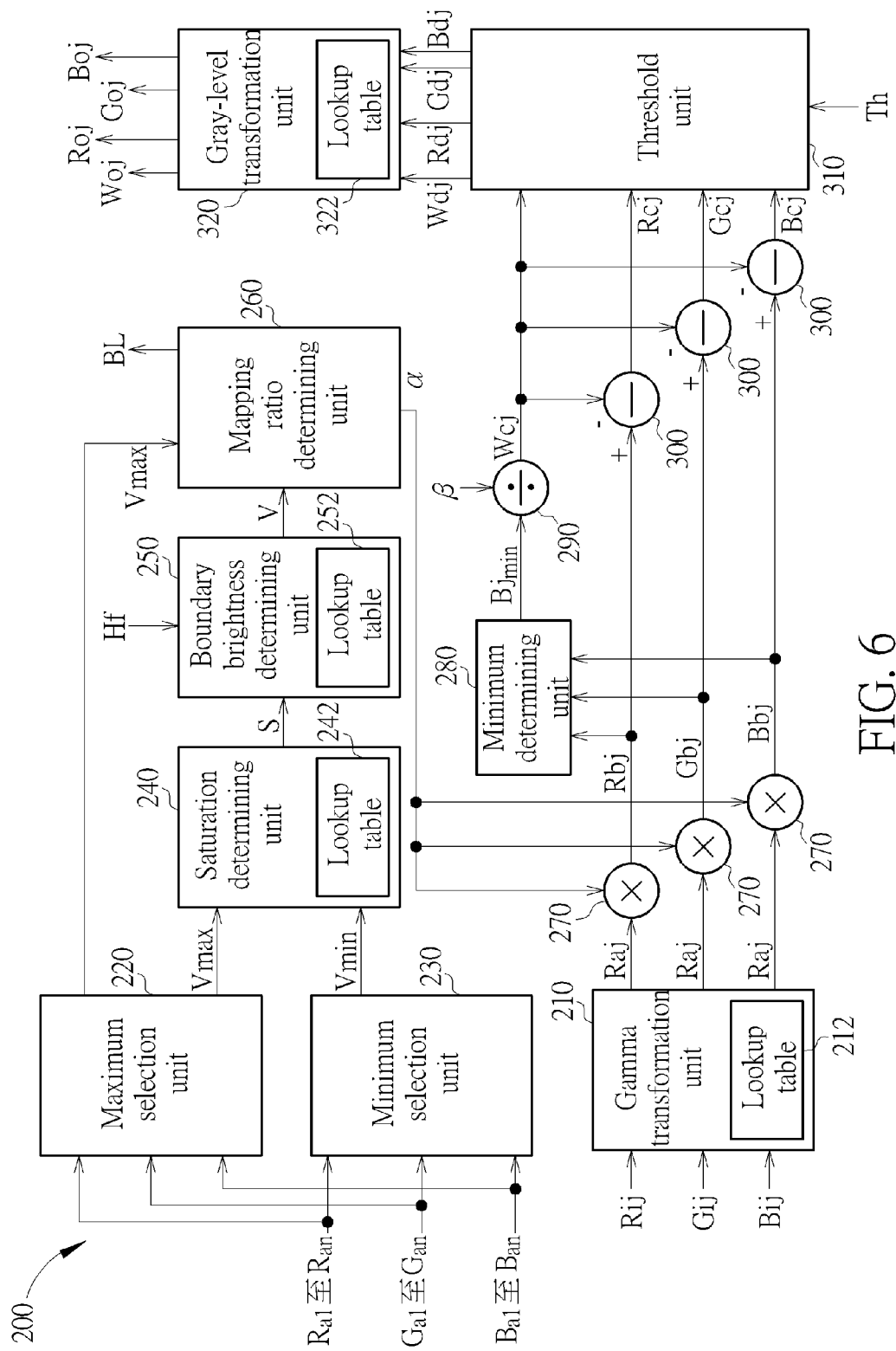
FIG. 6 is a functional block diagram of a driving circuit of the display in FIG. 1.

Please refer to FIG. 6. FIG. 6 is a functional block diagram of a driving circuit 200 of the display 100 in FIG. 1. The driving circuit 200 may control the operations of the pixels 104 of each display area 102 according to the corresponding images signals in the image signal $S_{IN}$. When the driving circuit 200 drives one of the display areas 102, a gamma transformation unit 210 of the driving circuit 200 receives red data values, green data values and blue data values in the image signal $S_{IN}$ that are corresponding to all of the pixels 104 of the display area 102. Take the $j^{th}$ pixel 104 of the $n^{th}$ display area 102 for example, the gamma transformation unit 210 receives a red data value Rij, a green data value Gij and a blue data value Bij of the $j^{th}$ pixel 104 from the image signal $S_{IN}$. In an embodiment of the present invention, the red data value, the green data value and the blue data value of each pixel 104 may be respectively the gray levels of a red subpixel, a green subpixel and a blue subpixel of the pixel 104, but the present invention is not limited thereto. In the embodiment, the gamma transformation unit 210 performs gamma transformations on the red data value Rij, the green data value Gij and the blue data value Bij to transform the red data value Rij, the green data value Gij and the blue data value Bij into a red brightness value Raj, a green brightness value Gaj and a blue brightness value Baj of the $j^{th}$ pixel 104, such that the signals corresponding to the graylevels may be converted to correctly match the brightness of the backlight of the pixel 104. In detail, the gamma transformation unit 210 respectively divides the red data value Rij, the green data value Gij and the blue data value Bij, and then exponentiates the results to a power of 2.2 to obtain the red brightness value Raj, the green brightness value Gaj and the blue brightness value Baj of the $j^{th}$ pixel 104. In other words, the red brightness value Raj, the green brightness value Gaj and the blue brightness value Baj may be presented as follow:

$$Raj=(Rij/255)^{2.2} \tag{1}$$

$$Gaj=(Gij/255)^{2.2} \tag{2}$$

$$Baj=(Bij/255)^{2.2} \tag{3}$$

In an embodiment of the present invention, the gamma transformation unit 210 may have a lookup table 212, and the gamma transformation unit 210 selects the red brightness value Raj, the green brightness value Gaj and the blue brightness value Baj from the lookup table 212 according to the red data value Rij, the green data value Gij and the blue data value Bij.

In addition, the driving circuit 200 further comprises a maximum selection unit 220 and a minimum selection unit 230. The maximum selection unit 220 is configured to setting a maximum of the red brightness values $R_{a1}$ to $R_{an}$, the green brightness values $G_{a1}$ to $G_{an}$ and the blue brightness values $B_{a1}$ to $B_{an}$ of the n pixels 104 of the display area 102 as a maximum brightness value Vmax, and the minimum selection unit 230 is configured to setting a minimum of the red brightness values $R_{a1}$ to $R_{an}$, the green brightness values $G_{a1}$ to $G_{an}$ and the blue brightness values $B_{a1}$ to $B_{an}$ of the n pixels 104 of the display area 102 as a minimum brightness value Vmin. Therefore, the maximum brightness value Vmax and the minimum brightness value Vmin may be presented as follow:

$$Vmax=max(R_{a1} \text{ to } R_{an}, G_{a1} \text{ to } G_{an}, B_{a1} \text{ to } B_{an}) \qquad (4)$$

$$Vmin=min(R_{a1} \text{ to } R_{an}, G_{a1} \text{ to } G_{an}, B_{a1} \text{ to } B_{an}) \qquad (5)$$

Moreover, the driving circuit 200 further comprises a saturation determining unit 240 configured to obtain a saturation value S of the display area 102 according to the maximum brightness value Vmax and the minimum brightness value Vmin. The saturation determining unit 240 may have a lookup table 242, and the saturation determining unit 240 may select the saturation value S from the lookup table 242 according to the maximum brightness value Vmax and the minimum brightness value Vmin. In an embodiment of the present invention, the relationship among the saturation value S, the maximum brightness value Vmax and the minimum brightness value Vmin may be presented as follow:

$$S=[Vmax-Vmin]/Vmax \qquad (6)$$

Further, the driving circuit 200 may have a boundary brightness determining unit 250 configured to transform the saturation value S into a boundary brightness value V according to a human factor Hf. The human factor Hf is obtained based on theoretical inference and human factor experiments, and used to maintain the quality of the images of the display 100 within an acceptable range when the brightness and the energy consumption of the backlight module 110 are reduced. How to obtain the human factor Hf based on theoretical inference and human factor experiments will be described later in an exemplary embodiment. Moreover, in an embodiment of the present invention, the boundary brightness determining unit 250 has a lookup table 252 established based on the human factor Hf, and the boundary brightness determining unit 250 may select the boundary brightness value V from the lookup table 252 according to the saturation value S. In an embodiment of the present invention, the boundary brightness value V may be presented as follow:

$$V = \begin{cases} 2 & \text{if } S < 0.5 \\ 2.51 - 1.11 \times S & \text{if } S \geq 0.5 \end{cases} \qquad (7)$$

Figure 7:
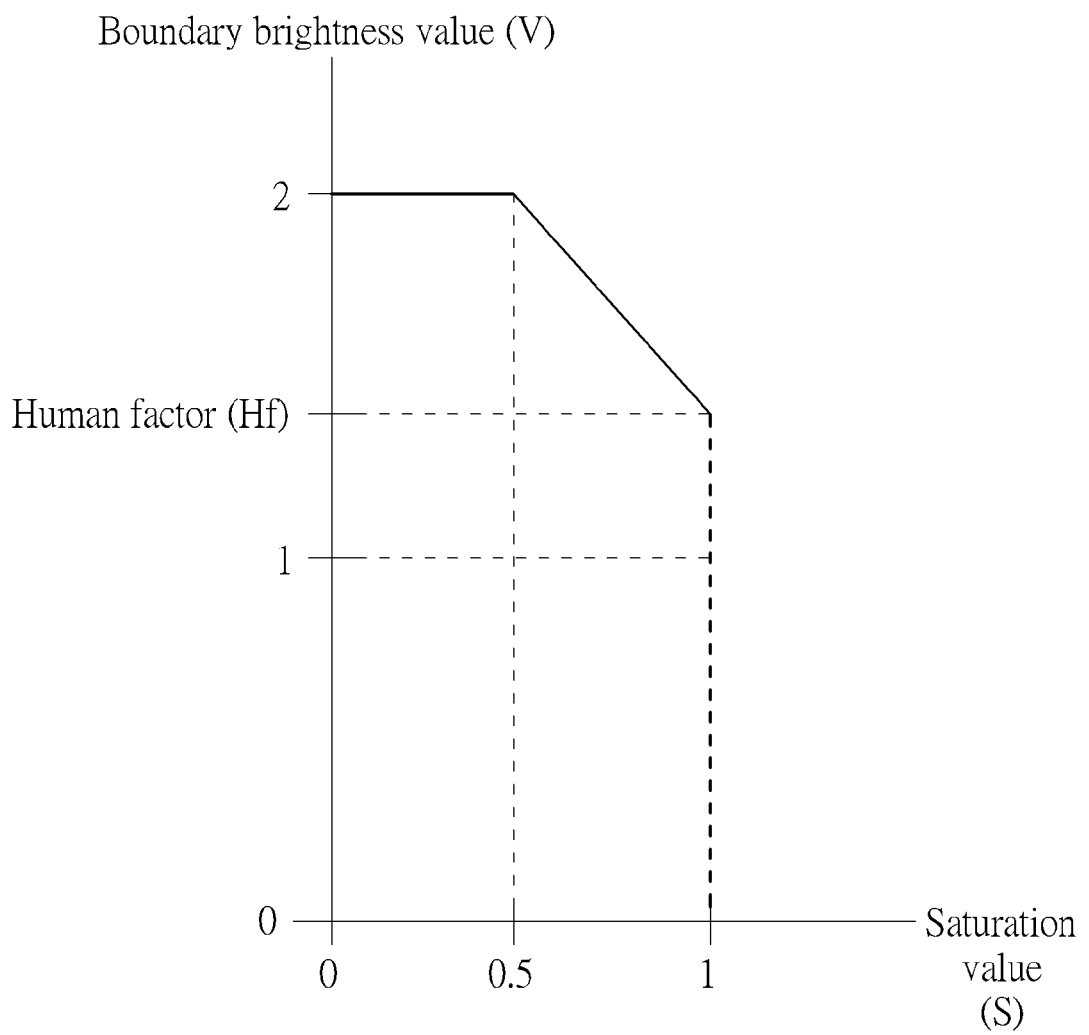
FIG. 7 is a diagram illustrating the relationship between a saturation value and a boundary brightness value.

Where, the equation (7) is established according to the human factor Hf and may be termed as a color space boundary equation. Please refer to FIG. 7. FIG. 7 is a diagram illustrating the relationship between the saturation value S and the boundary brightness value V. For example, if the human factor Hf is equal to 1.4, the boundary brightness value V is equal to the human factor Hf while the saturation value S is equal to 1.

Please refer to FIG. 6 again. The driving circuit 200 may further comprise a mapping ratio determining unit 260, which is configured to obtain a mapping ratio α according to the boundary brightness value V and the maximum brightness value Vmax. In an embodiment of the present invention, the relationship among the mapping ratio α, the boundary brightness value V and the maximum brightness value Vmax may be presented as follow:

$$\alpha=V/Vmax \qquad (8)$$

Moreover, the mapping ratio determining unit 260 may output an adjustment ratio BL to the backlight module 110 according to the mapping ratio α, such that a driving current of the backlight unit 108 corresponding to the display area 102 may be adjusted according to the adjustment ratio BL. If the maximum of the driving current of the backlight unit 108 is Imax, and the adjusted driving current of the backlight unit 108 is I, then $$I=Imax \times BL \qquad (9)$$

Where, the driving current of the backlight unit 108 may be adjusted according to a pulse width modulation (PWM) method, but the present invention is not limited thereto. Moreover, in an embodiment of the present invention, the adjustment ratio BL is equal to a result of multiplying a reciprocal of the mapping ratio α by the human factor Hf. That is:

$$BL=Hf/\alpha \qquad (10)$$

Three multipliers 270 of the driving circuit 200 respectively multiply the red brightness value Raj, the green brightness value Gaj and the blue brightness value Baj by the mapping ratio α to obtain a red mapping brightness value Rbj, a green mapping brightness value Gbj and a blue mapping brightness value Bbj of the $j^{th}$ pixel 104 of the $n^{th}$ display area 102. Accordingly, the three mapping brightness values Rbj, Gbj and Bbj may be presented as follow:

$$Rbj=Raj \times \alpha \qquad (11)$$

$$Gbj=Gaj \times \alpha \qquad (12)$$

$$Bbj=Baj \times \alpha \qquad (13)$$

In addition, a minimum determining unit 280 of the driving circuit 200 selects the minimum Bjmin of the red mapping brightness value Rbj, the green mapping brightness value Gbj and the blue mapping brightness value Bbj. In other words, the minimum Bjmin corresponding to the $j^{th}$ pixel 104 of the display area 102 may be presented as follow:

$$Bjmin=min(Rbj,Gbj,Bbj) \qquad (14)$$

The driving circuit 200 further comprises a divider 290, which is configured to divide the minimum Bjmin of the red mapping brightness value Rbj, the green mapping brightness value Gbj and the blue mapping brightness value Bbj by an adjustment parameter β to obtain a white transformation brightness value Wcj of the $j^{th}$ pixel 104. Where, the white transformation brightness value Wcj may be presented as follow:

$$Wcj=Bjmin/\beta \qquad (15)$$

In an embodiment of the present invention, the adjustment parameter β is set to 2, but the present invention is not limited thereto. The greater the adjustment parameter β, the less the obtained brightness of the white subpixel 106W. Contrariwise, the less the adjustment parameter β, the greater the obtained brightness of the white subpixel 106W. Therefore, the brightness of the white subpixel 106W may be adjusted by adjusting the adjustment parameter β.

The driving circuit 200 further comprises three subtractors 300, which are respectively configured to subtract the white transformation brightness value Wcj from the red mapping brightness value Rbj, the green mapping brightness value Gbj and the blue mapping brightness value Bbj to obtain a red transformation brightness value Rcj, a green transformation brightness value Gcj and a blue transformation brightness value Bcj of the $j^{th}$ pixel 104 of the display area 102. Therefore, $$Rcj=Rbj-Wcj \qquad (16)$$

$$Gcj = Gbj - Wcj \quad (17)$$

$$Bcj = Bbj - Wcj \quad (18)$$

The driving circuit 200 further comprises a threshold unit 310, which is configured to obtain a red output brightness value Rdj, a green output brightness value Gdj, a blue output brightness value Bdj and a white output brightness value Wdj of the $j^{th}$ pixel 104 of the display area 102 by respectively determining whether the red transformation brightness value Rcj, the green transformation brightness value Gcj, the blue transformation brightness value Bcj and the blue transformation brightness value Wcj are greater than a threshold Th. In an embodiment of the present invention, the threshold Th is set to 1, and the red output brightness value Rdj, the green output brightness value Gdj, the blue output brightness value Bdj and the white output brightness value Wdj may be presented as follow:

$$Rdj = \begin{cases} Th & \text{if } Rcj \geq Th \\ Rcj & \text{if } Rcj < Th \end{cases} \quad (19)$$

$$Gdj = \begin{cases} Th & \text{if } Gcj \geq Th \\ Gcj & \text{if } Gcj < Th \end{cases} \quad (20)$$

$$Bdj = \begin{cases} Th & \text{if } Bcj \geq Th \\ Bcj & \text{if } Bcj < Th \end{cases} \quad (21)$$

$$Wdj = \begin{cases} Th & \text{if } Wcj \geq Th \\ Wcj & \text{if } Wcj < Th \end{cases} \quad (22)$$

The driving circuit 200 further comprises a gray-level transformation unit 320, which is configure to transform the red output brightness value Rdj, the green output brightness value Gdj, the blue output brightness value Bdj and the white output brightness value Wdj into a red output data value Roj, a green output data value Goj, a blue output data value Boj and a white output data value Woj of the $j^{th}$ pixel 104 of the display area 102 respectively. In detail, the gray-level transformation unit 320 performs inverse gamma transformations on the red output brightness value Rdj, the green output brightness value Gdj, the blue output brightness value Bdj and the white output brightness value Wdj to transform the red output brightness value Rdj, the green output brightness value Gdj, the blue output brightness value Bdj and the white output brightness value Wdj, which represent brightness, into the red output data value Roj, the green output data value Goj, the blue output data value Boj and the white output data value Woj, which represent graylevels. Accordingly, the red subpixel 106R, the blue subpixel 106B, the green subpixel 106G and the white subpixel 106W of the $j^{th}$ pixel 104 of the display area 102 may operate according to the red output data value Roj, the green output data value Goj, the blue output data value Boj and the white output data value Woj respectively. Moreover, the gray-level transformation unit 320 may exponentiate the red output brightness value Rdj, the green output brightness value Gdj, the blue output brightness value Bdj and the white output brightness value Wdj to a power of 1/2.2 respectively, and then respectively multiply the results by 255. In other words, the red output data value Roj, the green output data value Goj, the blue output data value Boj and the white output data value Woj may be presented as follow:

$$Roj = (Rdj)^{1/2.2} \times 255 \quad (23)$$

$$Goj = (Gdj)^{1/2.2} \times 255 \quad (24)$$

$$Boj = (Bdj)^{1/2.2} \times 255 \quad (25)$$

$$Woj = (Wdj)^{1/2.2} \times 255 \quad (26)$$

In an embodiment of the present invention, the gray-level transformation unit 320 may have a lookup table 322. The gray-level transformation unit 320 may select the red output data value Roj, the green output data value Goj, the blue output data value Boj and the white output data value Woj from the lookup table 322 according to the red output brightness value Rdj, the green output brightness value Gdj, the blue output brightness value Bdj and the white output brightness value Wdj.

When the driving circuit 200 outputs the red output data values (e.g. Roj), the green output data values (e.g. Goj), the blue output data values (e.g. Boj) and the white output data values (e.g. Woj) of all of the pixels 104 of a frame of the display 100, the display 100 displays the frame. Moreover, if the display 100 displays a pure color (i.e. pure red, pure green, pure blue or pure white) image, all of the red output data values, the green output data values, the blue output data values or the white output data values are equal to each other.

In order to describe the method of the present invention more detail, three cases when the display 100 displays a pure red image, a pure white image and a yellow image at different times are taken as examples. It is supposed that the human factor Hf is equal to 1.4, the adjustment parameter β is equal to 2, and the threshold Th is equal to 1. According to the equations (1) to (26), in the case when the display 100 displaying a pure red image, (Rij, Gij, Bij)=(255, 0, 0); (Raj, Gaj, Baj)=(1, 0, 0); Vmax=max(1, 0, 0)=1; Vmin=min(1, 0, 0)=0; S=(Vmax−Vmin)/Vmax=1; V=2.51-1.11×S=1.4; α=V/Vmax=1.4; BL=Hf/α=100%; (Rbj, Gbj, Bbj)=(1, 0, 0)×α=(1.4, 0, 0); Bj$_{min}$=min(Rbj, Gbj, Bbj)=0; Wcj=0/2=0; (Rcj, Gcj, Bcj, Wcj)=(1.4, 0, 0, 0); (Rdj, Gdj, Bdj, Wdj)=(1, 0, 0, 0); and (Roj, Goj, Boj, Woj)=(255, 0, 0, 0). In the case when the display 100 displays a pure white image, (Rij, Gij, Bij)=(255, 255, 255); (Raj, Gaj, Baj)=(1, 1, 1); Vmax=max (1, 0, 0)=1; Vmin=min (1, 0, 0)=1; S=(Vmax−Vmin)/Vmax=0; V=2; u=V/Vmax=2; BL=Hf/α≈70%; (Rbj, Gbj, Bbj)=(1, 1, 1)×α=(2, 2, 2); Bj$_{min}$=min(Rbj, Gbj, Bbj)=2; Wcj=0.2/2=0.1; (Rcj, Gcj, Bcj, Wcj)=(1, 1, 1, 1); (Rdj, Gdj, Bdj, Wdj)=(1, 1, 1, 1); and (Roj, Goj, Boj, Woj)=(255, 255, 255, 255). In the case when the display 100 displays a yellow image, (Rij, Gij, Bij)=(220, 150, 120); (Raj, Gaj, Baj)=(0.72, 0.31, 0.19); Vmax=max(0.72, 0.31, 0.19)=0.72; Vmin=min(0.72, 0.31, 0.19)=0.19; S=(Vmax−Vmin)/Vmax=0.736; V=2.51-1.11×S=1.69; α=V/Vmax=2.34; BL=Hf/α≈83%; (Rbj, Gbj, Bbj)=(0.72, 0.31, 0.19)×α= (1.69, 0.73, 0.45); Bj$_{min}$=min(Rbj, Gbj, Bbj)=0.45; Wcj=0.45/2=0.225; (Rcj, Gcj, Bcj, Wcj)=(1.47, 0.51, 0.225, 0.225); (Rdj, Gdj, Bdj, Wdj)=(1, 0.51, 0.225, 0.225); and (Roj, Goj, Boj, Woj)=(255, 187, 129, 129).

Figure 8:
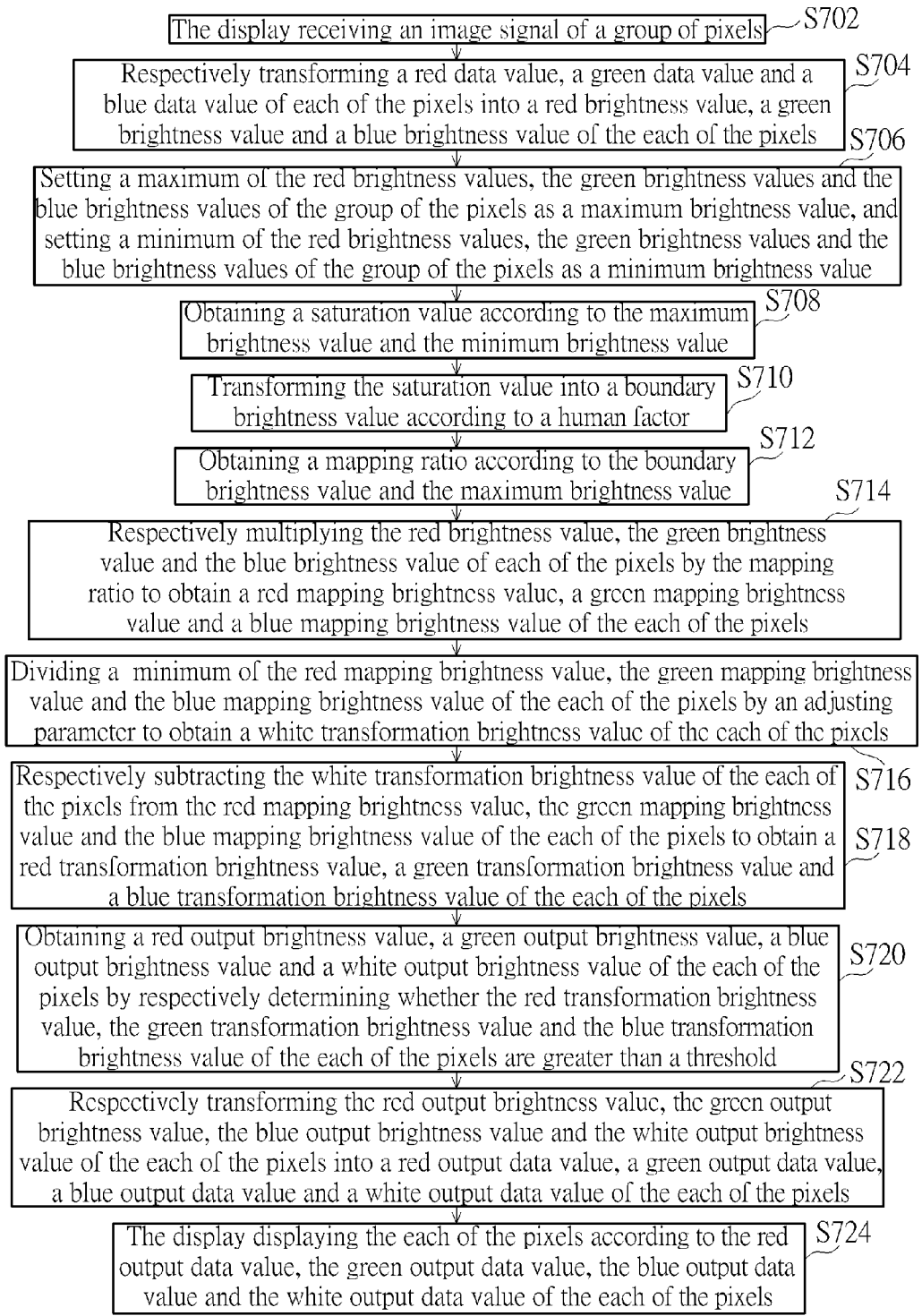
FIG. 8 is a flow chart of a method for controlling the display in FIG. 1 according to an embodiment of the present invention.

Please refer to FIG. 8. FIG. 8 is a flow chart of a method for controlling the display 100 in FIG. 1 according to an embodiment of the present invention. The method comprises the steps of:

Step S702: the display receiving an image signal of a group of pixels;

Step S704: respectively transforming a red data value, a green data value and a blue data value of each of the pixels into a red brightness value, a green brightness value and a blue brightness value of the each of the pixels;

Step S706: setting a maximum of the red brightness values, the green brightness values and the blue brightness values of the group of the pixels as a maximum brightness value, and setting a minimum of the red brightness values, the green brightness values and the blue brightness values of the group of the pixels as a minimum brightness value;

Step S708: obtaining a saturation value according to the maximum brightness value and the minimum brightness value;

Step S710: transforming the saturation value into a boundary brightness value according to a human factor;

Step S712: obtaining a mapping ratio according to the boundary brightness value and the maximum brightness value;

Step S714: respectively multiplying the red brightness value, the green brightness value and the blue brightness value of each of the pixels by the mapping ratio to obtain a red mapping brightness value, a green mapping brightness value and a blue mapping brightness value of the each of the pixels;

Step S716: dividing a minimum of the red mapping brightness value, the green mapping brightness value and the blue mapping brightness value of the each of the pixels by an adjusting parameter to obtain a white transformation brightness value of the each of the pixels;

Step S718: respectively subtracting the white transformation brightness value of the each of the pixels from the red mapping brightness value, the green mapping brightness value and the blue mapping brightness value of the each of the pixels to obtain a red transformation brightness value, a green transformation brightness value and a blue transformation brightness value of the each of the pixels;

Step S720: obtaining a red output brightness value, a green output brightness value, a blue output brightness value and a white output brightness value of the each of the pixels by respectively determining whether the red transformation brightness value, the green transformation brightness value and the blue transformation brightness value of the each of the pixels are greater than a threshold;

Step S722: respectively transforming the red output brightness value, the green output brightness value, the blue output brightness value and the white output brightness value of the each of the pixels into a red output data value, a green output data value, a blue output data value and a white output data value of the each of the pixels; and Step S724: the display displaying the each of the pixels according to the red output data value, the green output data value, the blue output data value and the white output data value of the each of the pixels.

As mentioned in the description of the prior art, images displayed on RGBW LCD panels of the prior art are darker when the images are single colored (pure color), and brightness may be too bright when RGBW LCD panels of the prior art display all white images. Accordingly, the present invention obtains the proper human factor Hf based on theoretical inference and human factor experiments by using the property of the wide colour gamut LCD panel having highly color saturation and the property of human eyes weak in distinguishing brightness differences of pure images. In theory, standard color points of two different color spaces are compared to obtain the human factor Hf. The two color spaces may be the sRGB color space and the Adobe RGB color space respectively, but the present invention is not limited thereto. As listed in the below Table 1 and Table 2. Tables 1 and 2 list the chromaticity value x, the chromaticity value y and the tristimulus value Y of a red standard point, a green standard point, a blue standard point and a white standard point in the sRGB color space and the Adobe RGB color space respectively. Since the green standard point has greater differences of the chromaticity values x, the chromaticity values y and the tristimulus values Y between the sRGB color space and the Adobe RGB color space, the tristimulus values Y of the green standard point are not considered anymore. Moreover, since human eyes are not sensitive to blue light, and the tristimulus value Y of the blue standard point is less than the tristimulus values Y of the red and green standard points, the influence of the blue standard point on the brightness of the images of the display is weaker than those of the red and green standard points. Therefore, the tristimulus values Y of the blue standard point are also not considered anymore. Therefore, in the present invention, the tristimulus values Y of the red standard point are chosen firstly for obtaining the human factor Hf, and the brightness of the backlight module of the RGBW panel is adjusted according to the human factor Hf. According to the Tables 1 and 2, the tristimulus value Y of the red standard point in the Adobe RGB color space is 1.4 (i.e. 0.2972/0.213) times of the tristimulus value Y of the red standard point in the sRGB color space. Thus, the human factor Hf may be set to 1.4. Moreover, when the tristimulus value Y of the red standard point in the sRGB color space is decreased to be 1/1.4 (i.e. almost be 0.7) times of itself, the three tristimulus values (X, Y, Z) are (0.412, 0.213, 0.019) as listed in the below Table 3. In addition, when the chromaticity value x, the chromaticity value y and the tristimulus value Y of the red standard point in the Adobe RGB color space are transformed into the three tristimulus values, the three tristimulus values (X, Y, Z) are (0.412, 0.212, 0.019) as listed in the below Table 4. Since the three tristimulus values (X, Y, Z) listed in Table 3 are almost identical to the three tristimulus values (X, Y, Z) listed in Table 4, it may be concluded that the brightness of the backlight module 110 may be decreased to be 1/1.4 (i.e. almost be 0.7) times of itself when the display 100 displays an red pure image, and that the color performances of the display 100 in the Adobe RGB color space and the sRGB color space would be still consistent in this condition.

TABLE 1

| sRGB color space | Red | Green | Blue | White |
|---|---|---|---|---|
| x | 0.64 | 0.3 | 0.15 | 0.3127 |
| y | 0.33 | 0.6 | 0.06 | 0.329 |
| Y | 0.213 | 0.7153 | 0.0721 | 1 |

TABLE 2

| AdobeRGB color space | Red | Green | Blue | White |
|---|---|---|---|---|
| x | 0.64 | 0.21 | 0.15 | 0.3127 |
| y | 0.33 | 0.71 | 0.06 | 0.329 |
| Y | 0.2972 | 0.6277 | 0.0751 | 1 |

TABLE 3

| sRGB color space | Red |
|---|---|
| X | 0.412 |
| Y | 0.213 |
| Z | 0.019 |

TABLE 4

| AdobeRGB color space | Red |
| --- | --- |
| X | 0.412 |
| Y | 0.212 |
| Z | 0.019 |

Figure 9:
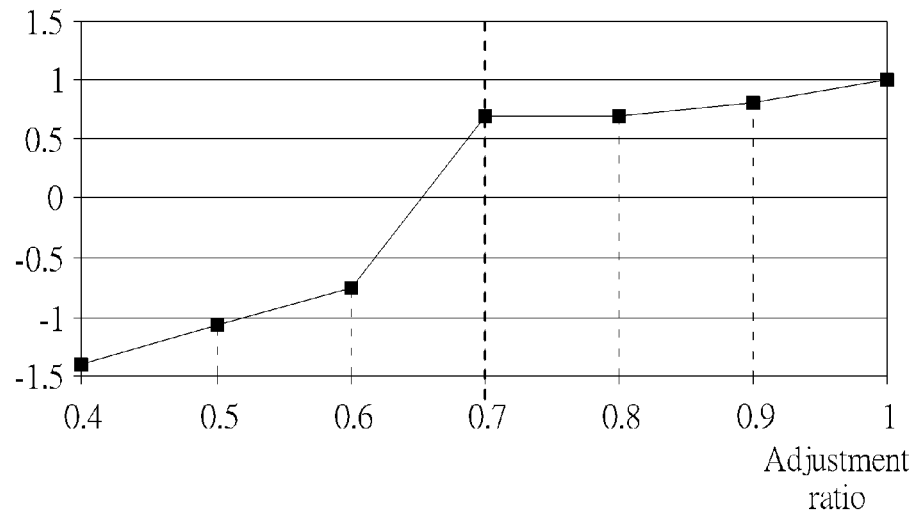
FIG. 9 is a diagram illustrating the relationship between the adjustment ratio and the standard score when the display in FIG. 1 displays a pure red image.
Figure 10:
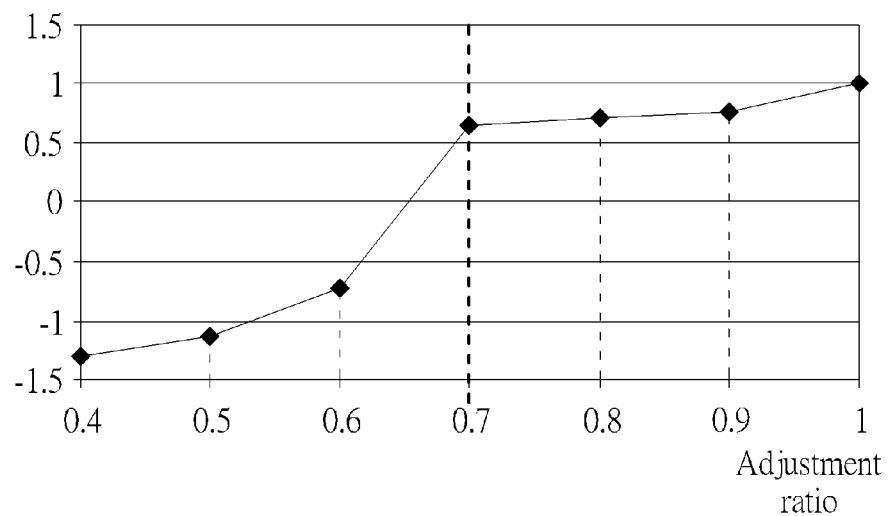
FIG. 10 is a diagram illustrating the relationship between the adjustment ratio and the standard score when the display in FIG. 1 displays a pure green image.
Figure 11:
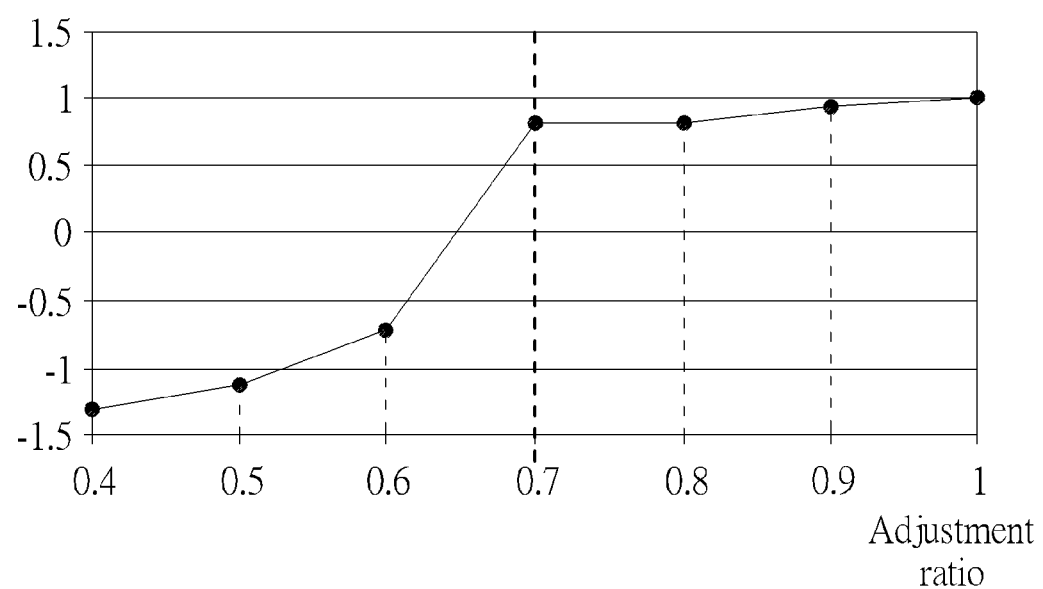
FIG. 11 is a diagram illustrating the relationship between the adjustment ratio and the standard score when the display in FIG. 1 displays a pure blue image.

When the human factor Hf is obtained theoretically, human factor experiments may be performed to double check whether the obtained human factor Hf is proper. When the human factor experiments are performed, a plurality of participants are invited and asked to simultaneously watch a RGB display and a RGBW display which operates according to the method of the present invention. The adjustment ratio of the backlight module of the RGB display is kept at 1 (i.e. duty cycle thereof equal to 100%), and the adjustment ratio BL of the backlight module of the RGBW display is decreased stepwise from 1 through 0.9, 0.8, 0.7, 0.6, 0.5 to 0.4 (i.e. duty cycle thereof is decreased stepwise from 100% through 90%, 80%, 70%, 60%, 50% to 40%). The participants are asked to score the performance of the RGBW display for each level of the adjustment ratio BL. The range of the score is 1 to 5. The greater the score, the less the difference of performances regarded by the participant between the RGB display and the RGBW display. Contrariwise, the less the score, the greater the difference of performances regarded by the participant between the RGB display and the RGBW display. Then, a standard score (i.e. z-score) of each pure image with each level of the adjustment ratio BL is obtained according to the scores graded by the participants. Please refer to FIG. 9 to FIG. 11. FIG. 9 is a diagram illustrating the relationship between the adjustment ratio BL and the standard score when the display 100 in FIG. 1 displays a pure red image. FIG. 10 is a diagram illustrating the relationship between the adjustment ratio BL and the standard score when the display 100 in FIG. 1 displays a pure green image. FIG. 11 is a diagram illustrating the relationship between the adjustment ratio BL and the standard score when the display 100 in FIG. 1 displays a pure blue image. According to FIGS. 9 to 11, when the adjustment ratio BL is not less than 0.7, the standard score is greater than 0. Therefore, the human factor Hf obtained based on theoretical inference is actually proper to be used in a wide colour gamut display.

In order to further ensure that the quality of the images of the display seen by users may be still maintained within an acceptable range, some limitations of the display 100 are added in other embodiments of the present invention. For example, the brightness of the display 100 is measured as a first primary color brightness when the display 100 displays a pure red image; the brightness of the display 100 is measured as a second primary color brightness when the display 100 displays a pure green image; the brightness of the display 100 is measured as a third primary color brightness when the display 100 displays a pure blue image; and the brightness of the display 100 is measured as a pure white brightness when the display 100 displays a pure white image. In an embodiment of the present invention, a ratio of the first primary color brightness to the pure white brightness is between 0.14 to 0.16. In another embodiment of the present invention, a ratio of the second primary color brightness to the pure white brightness is between 0.48 to 0.5. In an embodiment of the present invention, a ratio of the third primary color brightness to the pure white brightness is between 0.07 to 0.09. In another embodiment of the present invention, a ratio of the sum of the first primary color brightness, the second primary color brightness and the third primary color brightness to the pure white brightness is between 0.7 to 0.75.

According to the method, when brightness of the backlight module of the display is reduced to decrease energy consumption of the display, quality of the images of the display seen by users is still maintained within an acceptable range.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling operations of a display based on a human factor, the method comprising:
   a driving circuit of the display receiving an image signal of a group of pixels, the group of pixel comprising a plurality of pixels, and each of the pixels comprising a red subpixel, a green subpixel, a blue subpixel and a white subpixel;
   a gamma transformation unit of the driving circuit respectively transforming a red data value, a green data value and a blue data value of each of the pixels into a red brightness value, a green brightness value and a blue brightness value of the each of the pixels;
   a maximum selection unit of the driving circuit setting a maximum of the red brightness values, the green brightness values and the blue brightness values of the pixels as a maximum brightness value, and a minimum selection unit of the driving circuit setting a minimum of the red brightness values, the green brightness values and the blue brightness values of the pixels as a minimum brightness value;
   a saturation determining unit of the driving circuit obtaining a saturation value according to the maximum brightness value and the minimum brightness value;
   a boundary brightness determining unit of the driving circuit transforming the saturation value into a boundary brightness value according to the human factor;
   a mapping ratio determining unit of the driving circuit obtaining a mapping ratio according to the boundary brightness value and the maximum brightness value;
   three multipliers of the driving circuit respectively multiplying the red brightness value, the green brightness value and the blue brightness value of each of the pixels by the mapping ratio to obtain a red mapping brightness value, a green mapping brightness value and a blue mapping brightness value of the each of the pixels;
   a divider of the driving circuit dividing a minimum of the red mapping brightness value, the green mapping brightness value and the blue mapping brightness value of the each of the pixels by an adjustment parameter to obtain a white transformation brightness value of the each of the pixels;
   three subtractors of the driving circuit respectively subtracting the white transformation brightness value of the each of the pixels from the red mapping brightness value, the green mapping brightness value and the blue mapping brightness value of the each of the pixels to obtain a red transformation brightness value, a green transformation brightness value and a blue transformation brightness value of the each of the pixels;
   a threshold unit of the driving circuit obtaining a red output brightness value, a green output brightness value, a blue output brightness value and a white output brightness value of the each of the pixels by respectively determining whether the red transformation brightness value, the green transformation brightness value, the blue transformation brightness value and the white transformation brightness value of the each of the pixels are greater than a threshold;

a gray-level transformation unit of the driving circuit respectively transforming the red output brightness value, the green output brightness value, the blue output brightness value and the white output brightness value of the each of the pixels into a red output data value, a green output data value, a blue output data value and a white output data value of the each of the pixels; and the display respectively controlling brightness of the red subpixel, the green subpixel, the blue subpixel and the white subpixel of the each of the pixels according to the red output data value, the green output data value, the blue output data value and the white output data value of the each of the pixels;

wherein a brightness of the display is a first primary color brightness when the display displays a pure red image, the brightness of the display is a pure white brightness when the display displays a pure white image, and a ratio of the first primary color brightness to the pure white brightness is between 0.14 to 0.16.

2. The method of claim 1 further comprising:
obtaining an adjustment ratio according to the mapping ratio.

3. The method of claim 2, wherein the adjustment ratio is equal to a result of multiplying a reciprocal of the mapping ratio by the human factor.

4. The method of claim 2 further comprising:
adjusting a driving current of a backlight module of the display according to the adjustment ratio.

5. The method of claim 1, wherein respectively transforming the red data value, the green data value and the blue data value of each of the pixels into the red brightness value, the green brightness value and the blue brightness value of the each of the pixels comprises:
respectively dividing the red data value, the green data value and the blue data value of each of the pixels by 255, and then exponentiating to a power of 2.2.

6. The method of claim 1, wherein the saturation value is equal to a result of dividing a difference between the maximum brightness value and the minimum brightness value by the maximum brightness value.

7. The method of claim 1, wherein obtaining the saturation value according to the maximum brightness value and the minimum brightness value comprises:
obtaining the saturation value from a lookup table according to the maximum brightness value and the minimum brightness value.

8. The method of claim 1, wherein transforming the saturation value into the boundary brightness value according to the human factor comprises:
establishing a color space boundary equation according to the human factor; and
substituting the saturation value into the color space boundary equation to obtain the boundary brightness value.

9. The method of claim 1, wherein transforming the saturation value into the boundary brightness value according to the human factor comprises:
establishing lookup table according to the human factor; and
obtaining the boundary brightness value from the lookup table according to the saturation value.

10. The method of claim 1 further comprising:
calculating a Y tristimulus value of a red standard point of a first color space;
calculating a Y tristimulus value of a red standard point of a second color space; and
obtaining the human factor according to the Y tristimulus value of the red standard point of the first color space and the Y tristimulus value of the red standard point of the second color space.

11. The method of claim 10, wherein the first color space is the Adobe RGB color space, the second color space is the sRGB color space, and the human factor is equal to a result of dividing the Y tristimulus value of the red standard point of the first color space by the Y tristimulus value of the red standard point of the second color space.

12. The method of claim 1, wherein the mapping ratio is equal to a result of dividing the boundary brightness value by the maximum brightness value.

13. The method of claim 1, wherein respectively transforming the red output brightness value, the green output brightness value, the blue output brightness value and the white output brightness value of the each of the pixels into the red output data value, the green output data value, the blue output data value and a the white output data value of the each of the pixels comprises:
respectively exponentiating the red output brightness value, the green output brightness value, the blue output brightness value and the white output brightness value of the each of the pixels to a power of 1/2.2, and then multiplying by 255 respectively.

14. The method of claim 1, wherein the adjustment ratio is equal to 2.

15. The method of claim 1, wherein the threshold is equal to 1.

16. The method of claim 1, wherein a brightness of the display is a second primary color brightness when the display displays a pure green image, the brightness of the display is a pure white brightness when the display displays a pure white image, and a ratio of the second primary color brightness to the pure white brightness is between 0.48 to 0.5.

17. The method of claim 1, wherein a brightness of the display is a third primary color brightness when the display displays a pure blue image, the brightness of the display is a pure white brightness when the display displays a pure white image, and a ratio of the third primary color brightness to the pure white brightness is between 0.07 to 0.09.

18. The method of claim 1, wherein a brightness of the display is a first primary color brightness when the display displays a pure red image, the brightness of the display is a second primary color brightness when the display displays a pure green image, the brightness of the display is a third primary color brightness when the display displays a pure blue image, the brightness of the display is a pure white brightness when the display displays a pure white image, and a ratio of a sum of the first primary color brightness, the second primary color brightness and the third primary color brightness to the pure white brightness is between 0.7 to 0.75.

19. The method of claim 1, wherein the human factor is equal to 1.4.

* * * * *